2,574,094

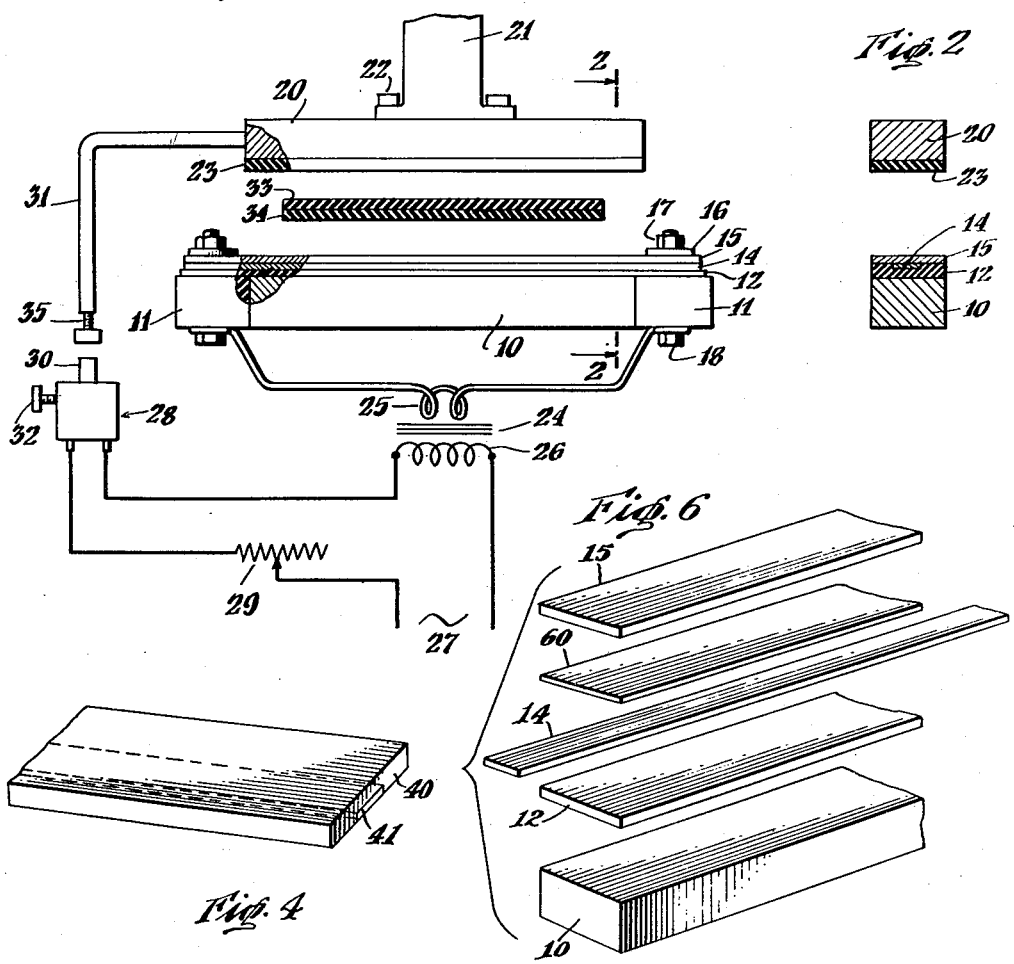
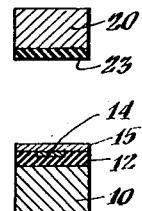
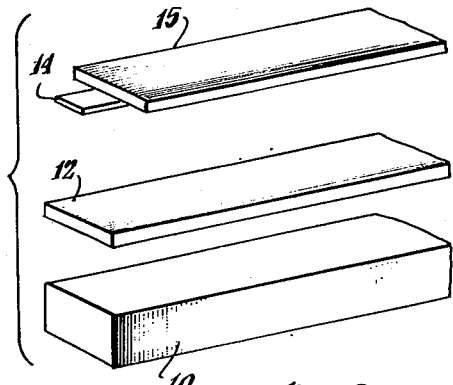
Nov. 6, 1951    A. FENER ET AL    2,574,094
HEAT SEALING MACHINE OF THE THERMAL IMPULSE TYPE
Filed Sept. 10, 1949
INVENTORS
Alfred Fener
Howard Fener
BY
ATTORNEY Patented Nov. 6, 1951

UNITED STATES PATENT OFFICE 2,574,094

HEAT-SEALING MACHINE OF THE THERMAL IMPULSE TYPE

Alfred Fener and Howard Fener, Brooklyn, N. Y., assignors to Nicholas Langer, New York, N. Y.

Application September 10, 1949, Serial No. 115,054

7 Claims. (Cl. 154—42)

This invention relates to the art of heatsealing thermoplastic films, and, more particularly, to a novel and improved sealing method and sealing member or bar for heatsealing machines of the thermal impulse type.

As disclosed in Langer Patent No. 2,460,460, heatsealing machines of the thermal impulse type essentially comprise a pair of pressure members or bars and a reciprocating mechanism therefor whereby pressure may be applied upon two or more layers of thermoplastic film to be heatsealed interposed therebetween. Examples of the commercially most important thermoplastic films are Pliofilm (rubber hydrochloride), Vinylite (a copolymer of vinyl chloride and vinyl acetate), Polythene (polyethylene), and Saran (vinyledene chloride). A heater element in the form of a thin and narrow strip of a metal of high specific resistance, such as a suitable nickel-chromium alloy known in the trade as Nichrome, is mounted on the face of at least one of said bars, constituting the operating or sealing surface of the machine. Sealing pulses of electric current may be passed through the said heater element under the control of a switching mechanism, the operation of which is coordinated to that of the reciprocating mechanism of the bars.

During the operation of the machine, operation of the switching mechanism is initiated substantially when the pressure members arrive into their pressure-applying position. A short pulse of current is then passed through the heater element, which, as a result of its low heat capacity, is heated to heatsealing temperature in a small fraction of a second. The heat thus produced is immediately transferred by surface contact to the region of the thermoplastic layers compressed between the bars, causing heatsealing thereof. A short period thereafter, the heat produced by the pulse of current is dissipated and the seal produced is cooled and consolidated under pressure whereby a strong and sound seal is produced.

Heatsealing machines of the thermal impulse type provide important advantages over the commonly used heatsealing machines in which the sealing member is continuously maintained at a constant sealing themperature. Due to the fact that the thermal impulse principle permits the sealed region to cool and to consolidate under pressure, the quality of the seal is greatly improved. Also, the thermal pulse principle makes it possible to readily seal films of materials, which cannot be sealed on an industrial scale with sealing members continuously maintained at constant sealing temperatures, such as particularly Polythene and Saran.

Although the heatsealing machines of the thermal impulse type provided excellent results, certain practical difficulties were experienced, particularly when applying the principle to high-speed packaging machinery where it may be desirable to provide as many as 2 or more complete sealing cycles per second. One of these difficulties was the adherence or sticking of the sealed layers to the heater element or strip after the sealing operation. Also, while the thickness of the heater element was quite low, generally in the order of 0.0015–0.003", this was substantially in the same order as that of the thermoplastic films to be sealed. During the sealing operation, the longitudinal edges of the heater strip would cut into the softened film, causing the production of a considerably weakened line or lines along which the sealed layers would easily break or tear. These difficulties seriously interfered with the desired high operating speeds, which to obtain is the present trend in the entire packaging industry.

It has now been discovered that the outstanding problem may be solved in a remarkably simple manner.

It is an object of the present invention to improve heatsealing machines of the thermal impulse type.

It is another object of the present invention to provide a novel heatsealing method which eliminates the foregoing difficulties now experienced in the high speed operation of heatsealing machines of the character described.

The invention also contemplates the provision of a novel and improved sealing member or bar for heatsealing machines of the thermal impulse type, which is capable of being operated equally well at low and at extremely high speeds in the complete absence of sticking and which permits the production of perfect seals free from weakened portions or lines at practically any commercially required speed.

Other and further objects and advantages of the invention will become apparent from the following description, taken in conjunction with the accompanying drawing, in which, Fig. 1 is a side elevational view, somewhat fragmentary in character and having parts in section, of a preferred embodiment of the invention;

Fig. 2 is a section taken on line 2—2 of Fig. 1;

Fig. 3 is an exploded perspective view of the sealing member or bar shown in Fig. 1;

Fig. 4 is a perspective view of a modified sealing element or strip suitable for use in the heatsealing machine of the invention, the thickness of the strip being greatly exaggerated for reasons of clarity;

Fig. 5 is a similar view of another modified sealing element, or strip; and

Fig. 6 is an exploded perspective view, similar to Fig. 3, of a modified sealing member or bar embodying the invention.

Referring now more particularly to Figs. 1 and 2 of the drawing, reference numeral 10 denotes a lower heatsealing member or bar formed of aluminum or some other metal having strength combined with high heat conductivity. Blocks 11 of insulating material are attached to the ends of bar 10 and form continuations of the upper surface thereof. Upon the top surface of bar 10, there is positioned a thin layer 12 of a heat-resistant insulating material, such as mica, or preferably a strip of glass fibre cloth impregnated with a silicone resin. On top of insulating layer 12 there is arranged a thin heater layer or strip 14 of a metal of high electrical conductivity, such as copper or silver. Finally, superimposed upon the entire structure just described, there is provided a sealing layer or strip 15, constituted of a metal having appreciably lower heat and electrical conductivity than that of the heater strip 14. Examples of suitable metals for sealing strip, which constitutes the operative or sealing face of bar 10, are Nichrome (a nickel base alloy containing 11-22% chromium and smaller amounts of silicon and manganese), Inconel (a nickel base heat- and oxidation resistant alloy with approximately 13% chromium, 6% iron, small amounts of manganese, silicon and copper), and Monel (a non-ferrous alloy containing 60-70% nickel, 25-35% copper, with minor amounts of iron, manganese, silicon and carbon). Layers 10, 11, 12, 14 and 15 are held in their assembled position by means of washers 16, bolts 18 and nuts 17 in a manner readily understood.

As it will be best observed in Fig. 3, heater strip 14 is much less in width than sealing strip 15, for reasons which will clearly appear as the description proceeds.

Heatsealing member or bar 10 is adapted to cooperate with a pressure member or bar 20 which may likewise be formed of aluminum or some other suitable metal. Pressure bar 20 is adapted to be displaced towards and pressed against the operative surface of bar 10 and sealing strip 15, by means of a suitable operating or reciprocating mechanism, which is diagrammatically indicated by a reciprocable support 21, secured to the pressure bar 20 by means of bolts 22. Preferably, the lower or operative surface of pressure bar 20 is covered with a layer 23 of elastic material capable of resisting the effect of heatsealing temperatures without appreciable deterioration. Suitable materials for this purpose are silicone rubber of Teflon (tetrafluorethylene). A covering of Teflon has the additional advantage that, due to its special surface characteristics, it prevents sticking of the thermoplastic film to the pressure bar.

Sealing pulses of an electric current may be supplied to heater strip 14 and sealing strip 15, which are electrically connected in parallel, from a step-down transformer 24. The secondary or low-voltage winding 25 of the said transformer is directly connected to the ends of strips 14 and 15 through bolts 18 and nuts 17. Primary winding 26 of the transformer has one of its terminals directly connected to one terminal of a source of alternating current 27, while the other terminals of the said primary winding is connected to the other terminal of source 27 through a switching mechanism generally denoted by reference numeral 28 and an adjustable resistance 29. The switching mechanism includes an actuating plunger 30, operable by an L-shaped actuating rod 31 having its horizontal end secured in pressure bar 20 and its vertical end arranged in cooperating relation with respect to the said plunger so that the plunger will be displaced and operation of the switching mechanism is initiated during the downward stroke of the reciprocating mechanism. Preferably, the switching mechanism is combined with a time delay device whereby the switching mechanism is automatically disabled a predetermined period after initiation of the sealing current pulse. The length of the time delay period is adjustable by means of a set-screw 32.

The switching mechanism and its combination with a time delay device may take a great variety of different forms, a full description of which is omitted for the sake of simplicity as they do not form part of the present invention. For further details of suitable switching and time delay devices, reference may be had to Langer Patents 2,460,460 and 2,479,375. In automatic heatsealing machines wherein a constant speed motor is employed for providing driving power, the switching mechanism may take the form of a simple switch operated by means of a cam, driven by the said motor either directly or by means of a suitable reducing gear.

From the foregoing description, the operation of the heatsealing machine of the invention will be readily understood by those skilled in the art. When it is desired to operate the machine, a pair of layers 33 and 34 of a thermoplastic film are placed between the sealing bar 10 and the pressure bar 20 and the said bars are displaced into their pressure applying position. Depending upon the adjustment of a set screw 35 at the lower end of actuating rod 31, sometime during this displacement, operation of switching mechanism 28 will be initiated and primary winding 26 will be energized from alternating current source 27 through rheostat 29. As a result, a current of lower voltage but higher intensity will be induced in secondary winding 25 which will energize the parallel-connected metal strips 14 and 15, causing the generation of heat therein.

Due to the fact that heater strip 14 is of considerably lower specific resistance than the superposed sealing strip 15, more current will flow therethrough and more heat will be generated therein in the unit of time than in the sealing strip. The two strips being in direct contact and thus in intimate heat exchange relation with each other throughout the length thereof, the heat produced in the heater strip will be transferred by conduction to the overlying sealing strip of greater width with great rapidity, heating it to heatsealing temperatures in a sealing region initially approximating the width of the underlying heater strip, which is the principal source of sealing heat. The width of the sealing region increases with the length and intensity of the pulse of sealing current, the first being adjustable by adjusting set screw 32 of the switching mechanism 28 and the latter being adjustable by adjusting rheostat 29. Thus, it will be noted that the sealing machine of the invention permits for the first time in the history of the heatsealing art the production of a seal of a width which is adjustable by the setting of the electrical conditions of operation. It is further to be observed that by proper adjustment of the duration and intensity of the sealing pulse, it is readily accomplished that the marginal regions of the wider sealing strip outside the sealing region, which of course include the lateral edges of the sealing strip, never reach heatsealing temperatures. Thus, the edges of the sealing strip will not cut into the layers of thermoplastic films sealed, thereby positively preventing the production of lines of reduced strength in the completed seal.

A predetermined period after initiation of the pulse of sealing current, the time delay device forming part of switching mechanism 28 becomes effective, automatically disabling the switching means and disconnecting the strips from the source of current. Preferably, pressure is maintained upon the seal for a short period thereafter, permitting the seal to cool and to consolidate under pressure, as this is set forth more fully in the above-mentioned Langer Patent 2,460,460. Thereupon, the bars are separated and the heatsealed layers 33, 34 are removed from the machine.

The heater and sealing strips are electrically insulated from the underlying heavy metal bar 10 by means of a thin layer of insulation 12 of a material which is not affected adversely by the operating temperatures. This layer of insulation is sufficiently thin to maintain the strips and the bar in intimate heat exchange relation with each other. Thus, any residual heat remaining in the strips after the sealing operation is quickly conducted away into the bar of very great heat capacity where it is harmlessly dissipated. This simple expedient effectively prevents the building up of heat in the strips which otherwise may occur when the sealing cycles follow each other with great rapidity. Positive cooling of the bar 10 may be further resorted to, if desired, as this is disclosed in a copending application of Nicholas Langer, Serial No. 598,777, filed June 11, 1945, now Patent No. 2,509,439, granted May 30, 1950.

In Fig. 2, the insulating layer 12 has been shown as substantially embedding the thickness of heater strip 14, a structure that would generally result after a few cycles of operation when the insulating layer is at least of a slightly compressible character. In case the insulating layer is substantially non-compressible, the greater width of sealing strip 15 will cause it to slightly bow or arch around the underlying narrower heater strip 14. It has been found that this bowing or arching, which is extremely slight due to the very low thickness of the heater strip, far from being detrimental, may even be advantageous in that it further and mechanically defines a sealing region in the operating surface of the bar which is necessarily narrower than that of the sealing strip 15.

Generally speaking, to permit operating the machine at very high speeds, it is desirable to reduce the heat capacity of all members in which the temperature is to fluctuate, such as the heater and sealing strips, as much as possible. While "low heat capacity" is a relative expression, its intended meaning in the present specification and claims is a heat capacity sufficiently low as to permit the temperature of the heater strip or sealing strip readily to follow the fluctuations in the intensity of the current flowing therethrough with a time lag which is negligible as compared to the duration of a complete sealing cycle. This low heat capacity may be accomplished, for example, by making the said heater and sealing strips as thin as it is compatible with their mechanical strength. Thus, the thickness of the strips may be in the range between 0.0005" and 0.005", depending upon the maximum operating speed desired. As a practical example, in a commercial heatsealing machine embodying the principles of the present invention, the sealing strip was formed of a Nichrome ribbon having a width of 0.25" and a thickness of 0.002", while the heater strip was formed of a copper ribbon having a width of 0.10" and a thickness of 0.0015". The underlying layer of insulation was formed of glass fibre cloth impregnated with a suitable silicone resin having a thickness of approximately 0.02", although the thickness of the said layer may be reduced as much as practicable with further improvement in operating efficiency.

Critically important advantages follow from the use of novel sealing bar of the invention. The most important of these advantages are as follows:

1. The sealing strip is not heated to heatsealing temperatures throughout its width but only in a longitudinal sealing region of lower width.

2. The width of the seal produced is adjustable by adjusting the characteristics of the electrical sealing pulse.

3. The marginal portions, including the lateral edges of the sealing strip, remain below heatsealing temperatures during a properly adjusted sealing cycle. This positively prevents the edges of the said strip from cutting into the sealed layers and consequent weakening thereof.

4. For the same reasons, sticking of the sealed layers to the sealing strip is completely eliminated. The sealed region will readily separate from and will practically drop off from the sealing surface.

It is to be observed that in order to accomplish the objects of the invention, it is not absolutely necessary to arrange the heater strip and the sealing strip in direct electrical contact with each other. Similar results may be obtained by a modified arrangement in which a very thin layer of electrical insulation is interposed between the heater strip and the superposed sealing strips, maintaining the two in intimate heat exchange relation with but electrically disconnected from each other. Examples of suitable materials for insulating the two strips from each other are mica or simply an anodized film formed on one or both contacting surfaces of the strips. In this modified form of the invention, only the heater strip is energized or heated by a current pulse passed therethrough while the sealing strip is heated in the manner described by heat conduction only. It is to be noted however, that all electrical insulating materials are at the time also insulators of heat, thereby appreciably retarding the transference of heat from the heater strip to the sealing strip. Therefore, in most cases the efficiency of this modified embodiment of the invention cannot attain that of the preferred form of the invention wherein the heater strip and sealing strip are in direct contact with each other throughout the length thereof.

This modified embodiment of the invention is illustrated in Fig. 6. It will be noted that this modified sealing member or bar is closely similar to the one shown in Fig. 3 and identical reference numerals have been used to denote corresponding parts. The difference between the two embodiments resides in the provision of a layer of insulation 60 between heater strip 14 and sealing strip 15, this layer being sufficiently thin to maintain the two metal strips in intimate heat exchange relation with but electrically insulated from each other.

While the useful life of both heater strip and sealing strip is quite long, occasional replacement thereof becomes necessary. This and also the initial assembly of the sealing bar is greatly facilitated if the two strips are provided in the form of a single composite strip or band in which the two strips of different material are bonded to each other throughout the length thereof. In Fig. 4 there is shown such a bimetallic or composite strip comprising a body portion 40 of Inconel and a narrower lower core portion 41 of copper or silver bonded thereto for example by rolling, brazing or other metallurgical operations. The upper surface of the composite strip constitutes the sealing strip while the embedded lower and narrower core portion of copper or silver constitutes the heater strip. Obviously, a composite strip of this type may be supplied to the users of the machine in rolls and all that is needed to install it is to cut a suitable length of the strip and to clamp it upon the insulative upper surface of sealing bar 10.

Another form of a composite strip suitable for the purposes of the invention is illustrated in Fig. 5 and comprises a body portion 50 of Inconel or Monel metal, having a thin and narrower layer or strip 51 of copper or silver deposited on the lower face thereof. This deposition may be accomplished by various procedures well known to those skilled in the art, such as by electroplating, metal vapor deposition, printing, spraying and the like. In this case, the upper surface of higher resistance metal constitutes the sealing strip 15 and the strip of low resistance metal deposited upon the lower surface of the strip constitutes the heater strip 14 of Fig. 1.

Although the present invention has been disclosed in connection with a few preferred embodiments thereof, variations and modifications may be resorted to by those skilled in the art without departing from the principles of the present invention. Thus, while the said preferred embodiments specifically relate to the production of seals having the shape of straight and narrow strips, the principles of the invention are applicable with equal or similar results to the formation of seals having a generally angular (for example L- or U-shaped), or curvilinear (for example circular or spiral) configuration. All of these variations and modifications are considered to be within the true spirit and scope of the present invention, as disclosed in the foregoing description and defined by the appended claims.

What is claimed is:

1. A sealing bar for heatsealing machines of the thermal impulse type comprising, in combination, a base, an elongated metal heater strip mounted on the face of said base through which sealing pulses of current may be passed, and an elongated metal sealing strip directly superimposed upon said heater strip and constituting the operative face of the bar, the width of said sealing strip being greater than that of said heater strip and the specific electrical conductivity of said sealing strip being lower than that of said heater strip.

2. A sealing bar for heatsealing machines of the thermal impulse type comprising, in combination, a metal base, an elongated metal heater strip mounted on the face of said base and in intimate heat exchange relation therewith but electrically disconnected therefrom, and an elongated metal sealing strip of a greater width and of a lower electrical conductivity than said heater strip directly superimposed upon said heater strip and in electrical contact therewith throughout the length thereof, said sealing strip having its edges substantially at equal distances from the corresponding edges of the heater strip and constituting the operative face of the bar whereby upon the passage of a current pulse through said strips the heat produced in the heater strip will exceed the heat produced in said sealing strip and the heat produced in the heater strip will be rendered effective in the surface of the sealing strip in an elongated sealing region which is greater in width than the width of the underlying heater strip and less in width than that of the sealing strip.

3. A sealing bar for heatsealing machines of the thermal impulse type comprising, in combination, a base member, a metal heater strip insulatedly mounted on said base member, and a metal sealing strip mounted directly on said heater strip and in electrical contact therewith throughout the length thereof, said sealing strip being formed of metal of lower electrical conductivity than the metal of the heater strip and having its lateral edges parallel-spaced from and externally of the lateral edges of the heater strip whereby upon the passage of a sealing impulse of current through the said strips the heat predominantly generated in the heater strip will become progressively effective in the sealing strip in a sealing region the width of which is between that of said heater and of said sealing strips and is a function of the intensity and duration of the sealing current impulse.

4. A sealing bar for heat sealing machines of the thermal impulse type comprising, in combination, a base member, a metal heater strip insulatedly mounted thereon, and a metal sealing strip conductively combined with the top surface of said heater strip, said sealing strip being wider than said heater strip, the specific resistances of said strips being so determined with respect to each other that upon the passage of a sealing pulse therethrough substantially more heat will be generated in the heater strip than in the sealing strip thereby heating the sealing strip to heatsealing temperatures only in a region of a width inferior to that of the sealing strip.

5. A sealing bar for heatsealing machines of the thermal impulse type comprising, in combination, a base member, a metal heater strip insulatedly mounted thereon, and a metal sealing strip of greater width coaxially superposed on said heater strip and in surface contact therewith, the thickness of said strips being in the range between 0.0005" and 0.005" and the specific electrical resistances of said strips being so determined with respect to each other that upon the passage of a sealing pulse through the parallel-connected strips the amount of heat generated in the heater strip will greatly exceed that directly generated in the sealing strip whereby the heat generated in the heater strip will be rendered effective by heat conduction in the exposed surface of the heater strip in a longitudinally extending sealing region of a width less than that of the sealing strip while the lateral marginal portions and edges of the sealing strip are maintained below heatsealing temperatures.

6. A machine for heatsealing thermoplastic layers comprising, in combination, a pair of cooperating pressure bars mounted for relative reciprocation, a thermal impulse sealing strip mounted on the pressure surface of one of said bars, said strip comprising a sealing band of low-conductivity metal constituting the sealing face of the bar and an underlying narrower heater band of high-conductivity metal constituting a heater element for said bar, means for displacing said bars into closed position to apply pressure to a region of the layers to be heatsealed interposed between said bars, and means operable substantially in the pressure-applying position of said bars for passing a pulse of current through said bands and to heat said sealing band to heatsealing temperatures in a sealing region narrower than the width of said sealing band thereby to seal said thermoplastic layers in said region.

7. A machine for heatsealing thermoplastic layers comprising, in combination, a pair of cooperating pressure bars mounted for relative reciprocation, a thermal impulse sealing strip mounted on the pressure surface of one of said bars, said strip comprising a sealing band of low-conductivity metal constituting the sealing face of the bar and an underlying narrower heater band of high-conductivity metal constituting a heater element for said bar, means for displacing said bars into closed position to apply pressure to a region of the layers to be heatsealed interposed therebetween, means operable in the pressure-applying position of said bars for passing a pulse of current through said bands and to heat said sealing band to heatsealing temperatures in a sealing region narrower than the width of said sealing band thereby to seal said thermoplastic layers in said region, and means for adjusting the intensity and duration of said pulse of current thereby to adjust the width of said region.

ALFRED FENER.
HOWARD FENER.

REFERENCES CITED

The following references are of record in the file of this patent:

UNITED STATES PATENTS

| Number | Name | Date |
|---|---|---|
| 1,026,456 | Ramband | May 14, 1912 |
| 1,810,225 | Pugh | June 16, 1931 |
| 1,905,364 | Brindley | Apr. 25, 1933 |
| 2,441,817 | Huff | May 18, 1948 |
| 2,454,338 | Pityo et al. | Nov. 23, 1948 |
| 2,460,460 | Langer | Feb. 1, 1949 |
| 2,479,375 | Langer | Aug. 16, 1949 |

FOREIGN PATENTS

| Number | Country | Date |
|---|---|---|
| 423,166 | Great Britain | Jan. 16, 1935 |